United States Patent [19]

Reid et al.

[11] Patent Number: 4,826,970

[45] Date of Patent: May 2, 1989

[54] CARBOXYMETHYL HYDROPHOBICALLY MODIFIED HYDROXYETHYLCELLULOSE

[75] Inventors: Albert R. Reid, Kenneth City, Fla.; Richard D. Royce, Jr., Longmeadow, Mass.

[73] Assignee: Hercules Incorporated, Wilmington, Del.

[21] Appl. No.: 97,777

[22] Filed: Sep. 17, 1987

[51] Int. Cl.$^4$ ...................... C08G 3/10; C08G 11/12
[52] U.S. Cl. ........................................ 536/66; 536/91
[58] Field of Search .................................. 536/66, 91

[56] References Cited

U.S. PATENT DOCUMENTS

| | | | |
|---|---|---|---|
| 2,517,577 | 8/1950 | Klug et al. | 536/97 |
| 3,789,117 | 1/1974 | Tsujino | 424/35 |
| 4,228,277 | 10/1980 | Landoll | 536/90 |
| 4,243,802 | 1/1981 | Landoll | 536/91 |
| 4,352,916 | 10/1982 | Landoll | 526/200 |
| 4,507,474 | 3/1985 | Raehase et al. | 536/91 |
| 4,629,743 | 12/1986 | Hong | 521/57 |
| 4,661,589 | 4/1987 | Adams et al. | 536/91 |
| 4,663,159 | 5/1987 | Brode II et al. | 536/91 |

OTHER PUBLICATIONS

Technical Information Bulletin VC-513 "Effect of Dispersant on Paints Thickened With Natrosol Plus HMHEC, Grade 330".

"Natrosol Plus Hydrophobically Modified Hydroxyethyl Cellulose" (publication 250-18) (1986).

"New Cellulosic Polymers For Rheology Control of Latex Paint", 57 Journal of Coatings Technology, pp. 63-72 (1985).

vol. 2 High Polymer (E. Ott et al. Eds., 2nd Ed. 1954).

Primary Examiner—John Kight
Assistant Examiner—Frederick Krass
Attorney, Agent, or Firm—Mark D. Kuller

[57] ABSTRACT

New anianic, water-soluble cellulose ether derivatives, in particular, carboxymethyl hydrophobically modified hydroxyethylcellulose (CMHMHEC), which are useful as thickeners in aqueous solutions, e.g., water-based protective coating compositions such as latex paints, as well as aqueous solutions, including water-based protective coating compositions containing these ternary cellulose ethers as thickeners and protective coloids, are disclosed. The cellulose ether derivatives are characterized in that they have a Brookfield LVF Viscosity of about 5 centipoise to about 60,000 centipoise in a 1 weight % solution.

14 Claims, No Drawings

CARBOXYMETHYL HYDROPHOBICALLY MODIFIED HYDROXYETHYLCELLULOSE

This invention relates to new water-soluble cellulose ether derivatives which are useful as thickeners in aqueous solutions, e.g., water-based protective coating compositions, and to aqueous solutions, including water-based protective coating compositions, containing the cellulose ethers as thickeners and protective colloids. Specifically, the invention relates to carboxymethyl hydrophobically modified hydroxyethylcellulose (CMHMHEC), and aqueous solutions, including water-based coating compositions, containing the same.

Water-based protective coating compositions in which the cellulose ether derivatives of the present invention are intended to be used include latex paints or dispersion paints. The principal ingredients of such water-soluble protective coating compositions are film-former latices selected from the group consisting of styrene-butadiene copolymers, vinyl acetate polymers and copolymers, and acrylic polymers and copolymers, opacifying pigments, dispersing agents and water-soluble protective colloids.

Typically, aqueous protective coating compositions contain, by weight of the total composition, from about 10 parts to about 50 parts of a latex, from about 10 parts to about 50 parts of an opacifying pigment, from about 0.1 part to about 2 parts of a dispersing agent, from about 0.1 part to about 2 parts of a water-soluble protective colloid.

Typical water-soluble protective colloids used in the manufacture of latex paints include casein, methyl cellulose, hydroxyethyl cellulose (HEC), sodium carboxymethyl cellulose, polyvinyl alcohol, starch, sodium polyacrylate, etc. These colloids are used to stabilize the latices and to improve open time (wet edge property). Unfortunately, these colloids are not without their disadvantages. The natural-based colloids, such as the aforementioned cellulose ethers, can be susceptible to biological degradation and frequently impart poor flow and leveling properties. The synthetic materials, such as the polyvinyl alcohol, on the other hand, often lack the desirable thickening efficiency thereby providing a formulation which has reduced sag resistance.

HEC is presently used in many latex paints. As is generally the case with high polymers, better thickening efficiency is realized with higher molecular weight HEC. Production of very high molecular weight HEC requires the use of more expensive cellulose furnishes such as cotton linters in lieu of the more common wood pulp types. Other disadvantages are noted by Landoll in U.S. Pat. No. 4,228,277. One major problem with latex paints containing high molecular weight HEC is that they tend to splatter. Landoll, in U.S. Pat. No. 4,228,277, discloses hydrophobically modified cellulose ether derivatives. Hydrophobic modification is effected by attaching a long chain alkyl group (hydrophobe) to the cellulose derivative. Due to the hydrophobe, these cellulose ether derivatives have greater thickening efficiency than the corresponding unmodified cellulose ether derivatives, such as HEC, and, accordingly, a smaller amount of modified cellulose ether derivatives may be used to achieve the same degree of viscosity as achieved with their unmodified equivalents and lower molecular weight cellulose ether derivatives can be substituted for their higher molecular weight unmodified equivalents. By using the lower molecular weight cellulose ether derivatives, in particular low molecular weight hydrophobically modified hydroxyethyl cellulose (HMHEC), the splattering problem is reduced or eliminated. However, HMHEC having higher hydrophobe levels, for example on the order of 0.7-1.0 weight percent with a $C_{16}$ hydrophobe (when the hydrophobe content is greater than 1.0% such HMHEC tends to be insoluble) and as high as approximately 4% with a $C_8$ hydrophobe tend to produce darker shades due to increased shear. This is believed to be due to interactions between hydrophobe and pigment. Accordingly, commercial HMHECs are generally produced with $C_{16}$ hydrophobes in an amount of about 0.4 to about 0.6 weight percent. This is disadvantageous since HMHEC having higher levels of hydrophobe is more efficient. Also, maintaining the hydrophobe content within such a narrow range causes processing difficulties in HMHEC manufacture.

Hence, there is a need for a protective colloid which is resistant to biological degradation, is an efficient thickener or viscosifier, which provides a latex paint with good flow, color and leveling properties, and which is easy to produce.

This invention is directed to carboxymethyl hydrophobically modified cellulose ether derivatives which are novel compounds useful as thickeners and protective colloids in water-based protective coating compositions, and to aqueous solutions, including water-based protective coating compositions, containing the same.

Any nonionic water-soluble cellulose ether derivative can be employed as the substrate to form useful carboxymethyl hydrophobically modified cellulose ether derivatives such as those of this invention. Thus, e.g., hydroxyethyl cellulose, hydroxypropyl cellulose, methyl cellulose, hydroxypropyl methyl cellulose, ethyl hydroxyethyl cellulose, and methyl hydroxyethyl cellulose can all be modified. These cellulose ether derivatives are available commercially or can be prepared by known methods, such as by treating a cellulose furnish, e.g., wood pulp or chemical cotton, with alkylene oxide in an alkaline medium. Typically the cellulosic furnish has a D.P. from about 1300 to about 2300. The amount of nonionic substituent, such as hydroxyethyl, does not appear to be critical so long as there is sufficient amount to assure that the ether is water soluble.

The preferred modified cellulose ethers are based on hydroxyethyl cellulose substrate. The most preferred cellulose ether substrate is HEC of about 50,000 to 400,000 molecular weight. Hydroxyethyl cellulose of this molecular weight level is the most hydrophilic of the materials contemplated. It can thus be modified to a greater extent than can other water-soluble cellulose ether substrates before insolubility is achieved. Accordingly, control of the modification process and control of the properties of the modified product can be more precise with this substrate.

The long chain alkyl modifier ("hydrophobe") can be attached to the cellulose ether substrate via an ether or ester linkage. Preferred is the ether linkage as the reagents most commonly used to effect etherification are readily obtained, the reaction is similar to that commonly used for the hydroxyethylation, and the reagents are usually more easily handled than the reagents employed for modification via other linkages. The resulting linkage is also usually more resistant to further reactions.

Although the hydrophobe is referred to as a "long chain hydrocarbon group", it will be recognized that except in the case where modification is effected with an alkyl halide, it is not a simple long chain hydrocarbon group. The group is actually an alpha-hydroxyalkyl radical in the case of an epoxide or an acyl radical in the case of an acid or acyl chloride. The terminology "long chain hydrocarbon group" is used since the size and effect of the hydrocarbon portion of the modifying molecule substantially obscure any noticeable effect from the connecting group. Properties are not significantly different from those of the product modified with the simple straight chain hydrocarbon group.

A more complete discussion of such hydrophobically modified cellulose ether derivatives and their preparation can be found in U.S. Pat. No. 4,228,277, cited above.

The carboxymethylation can be carried out by any known method such as those described in E. D. Klug et al. in U.S. Pat. No. 2,517,577 and at pages 937–949 of V.2 *High Polymers* (E. Ott et al. Eds., 2nd Ed. 1954).

The cellulose ethers of this invention can be prepared by modifying a cellulose furnish with the substituent groups in any order. However, the most efficient synthesis results when the cellulose furnish is hydroxyalkylated first, then hydrophobically modified, and finally carboxymethylated.

Carboxymethyl degree of substitution (C.M.D.S.) is the average number of carboxymethyl groups per anhydroglucose unit of the cellulose molecule. The hydroxyethyl molar substitution (H.E.M.S.) refers to the average number of moles of hydroxyethyl groups per anhydroglucose unit of the cellulose molecule.

The preferred polymer according to this invention is a carboxymethyl hydrophobically modified hydroxyethyl cellulose having a H.E.M.S. of about 1.8 to about 5.0, most preferably about 2.5 to about 4.5, a C.M.D.S. of about 0.05 to about 1.2, most preferably about 0.1 to about 1.0, and a long chain hydrocarbon group having 8 to 25 carbon atoms, most preferably 8 to 18 carbon atoms, in an amount of about 0.1 to 4.0%, most preferably, 0.2 to 2.5%, by weight of the fully substituted HMMEC.

The preparation of the cellulose ethers of this invention is illustrated in the following preparation example, which is exemplary and not intended to be limiting.

PREPARATION EXAMPLE

This example shows preparation of a carboxymethyl hydrophobically modified hydroxyethyl cellulose per this invention and is representative of preparation of all of the cellulose ether derivatives of this invention.

Chemical cotton (17.4 g), sodium hydroxide (6.9 g, 0.173 moles), water (28 g), tert-butanol (145 g), and acetone (9 g) were charged into a 500-ml glass reactor fitted with a multiported stainless steel head and stirrer assembly. Oxygen was removed by repeated vacuum/nitrogen purge. The resulting alkali cellulose was stirred 45 minutes at 25° C. Then ethylene oxide (9.0 g, 0.204 moles) was added and the temperature raised over 30 minutes to 55° C. and held at 55° C. for 45 minutes. A second increment of ethylene oxide (13.5 g, 0.295 mole) and cetyl bromide (4.3 g, 0.0142 mole) was added and the temperature raised from 55° C. to 70° C. over 30 minutes and held at 70° C. for 45 minutes. The temperature was then raised to 95° C. and held at 95° C. for 150 minutes. The reaction was cooled to 70° C. and monochloroacetic acid (4.1 g, 0.043 mole) dissolved in 10-ml of tert-butanol was added. The temperature was held at 70° C. for 60 minutes. The mixture was then cooled to 25° C. and poured into a stainless steel beaker. Neutralization was accomplished by the addition of 7.8 g of 70 wt % nitric acid and 0.5 g of acetic acid to achieve a slurry pH of between 8 and 9. The slurry was filtered and washed six times with 550-ml portions of 15 wt % aqueous acetone and two times with 100% acetone. The product was dried on a rotary evaporator and 29.8 g of CMHMHEC was obtained as a fine white powder with the following analysis: H.E.M.S.=2.7, C.M.D.S.=0.2, wt. % $C_{16}H_{33}$=0.7 (based on the weight % of the total HMMEC).

The cellulose ether derivatives of this invention are characterized in that they have a viscosity in the range of about 5 to about 60,000 centipoise in a 1 weight % solution, using a Brookfield Synchro-Lectric Model LVF Viscometer at 6 rpm (Brookfield LVF Viscosity).

The cellulose ethers of this invention are useful as thickeners in latex paint, in essentially the same manner as described with respect to use of hydrophobically modified cellulose ethers in U.S. Pat. No. 4,228,277, cited above.

The viscosifying effect of a CMHMHEC depends on the backbone used, molecular weight, C.M.D.S., H.E.M.S., hydrophobe length, and amount of hydrophobe, etc. Further, the amount of the CMHMHEC used determines viscosity. CMHMHEC may be added in any amount sufficient to modify viscosity to the desired degree. Generally, the total amount of CMHMHEC will be in the range of about 0.1 to about 2.0%, preferably 0.5% to 1.0%, based on the weight of the total protective coating, e.g., latex paint.

Molecular weight is generally directly related to viscosifying effect with higher molecular weight CMHMHECs imparting greater viscosity than similar low molecular weight CMHMHECs. Molecular weight may be determined by extrapolation from the degree of polymerization. The molecular weight of the CMHMHEC can be varied by degradation or depolymerization by any conventional means such as treatment with peroxide, to obtain the desired molecular weight, either before or after substitution with the hydroxyethyl, carboxymethyl and hydrophobic groups.

The solution viscosity may be further controlled through use of surfactants. Neutral or nonionic surfactants interact with the hydrophobic groups to increase solution viscosity. Cationic surfactants interact with the anionic carboxymethyl groups to form higher molecular weight complexes (ionic complexes) which lead to increased solution viscosity.

This invention is illustrated in the following examples, which are not intended to be limiting. Therein, all percentages, etc., are by weight unless othewise stated.

EXAMPLES 1–35

Examples 1–35 were conducted to demonstrate the usefulness of this invention. Examples 1, 6, 11, 16, 21, 26, 31, 33 and 35 are comparative examples directed to use of noncarboxymethylated cellulose derivatives, i.e., HMHEC. Example 28 is a comparative example directed to a non-hydrophobically modified carboxymethyl hydroxyethyl cellulose (CMHEC).

HMHEC, CMHMHEC and CMHEC were dispersed in pure water and sodium salt solution, and their viscosity was determined using a Brookfield Synchro-Lectric Model LVF Viscometer at 6 rpms and 1% polymer concentration.

The pH was varied by adding acidic or basic solutions of sufficiently high strength so that only a few drops had to be added to attain the desired pH. Accordingly, pH was modified without significantly affecting the concentration of cellulose ether derivative in the solution.

Results are shown in Table 1.

13-15), whereas materials of lesser solubility exhibit increased viscosity at higher pH (examples 17, 18, 22 and 27).

In addition, increasing salt (sodium chloride) concentration results in increasing viscosity so long as the materials remain fully soluble. Higher salt concentrations do, however, reduce the solubility of highly hy-

TABLE 1

| | | | | Brookfield Viscosity, 6 rpms (1% polymer concentration), (cps) | | | | | | | |
|---|---|---|---|---|---|---|---|---|---|---|---|
| | | | | NaCl Concentration[2] | | | | | Pure Water[2] | | |
| Example No. | Hydrophobe | Wt. % Hydrophobe | C.M.D.S.[1] | 0% | 1% | 5% | 10% | 20% | 0% (pH = 3) | 0% (pH = 7) | 0% (pH = 11) |
| 1 (HMHEC) | $C_{16}H_{33}$ | 0.2 | — | 78 | 80 | 86 | 170 | 2,280 | 78 | 78 | 78 |
| 2 (Invention) | $C_{16}H_{33}$ | 0.2 | .05 | 70 | 75 | 77 | 125 | 1,175 | 60 | 60 | 45 |
| 3 (Invention) | $C_{16}H_{33}$ | 0.2 | .2 | 50 | 55 | 60 | 80 | 625 | 60 | 60 | 50 |
| 4 (Invention) | $C_{16}H_{33}$ | 0.2 | .5 | 50 | 55 | 65 | 85 | 340 | 98 | 52 | 50 |
| 5 (Invention) | $C_{16}H_{33}$ | 0.2 | 1.0 | 50 | 55 | 60 | 60 | 175 | 75 | 40 | 50 |
| 6 (HMHEC) | $C_{16}H_{33}$ | 0.4 | — | 500 | 525 | 730 | 1,450 | 6,000 | 500 | 500 | 500 |
| 7 (Invention) | $C_{16}H_{33}$ | 0.4 | .05 | 225 | 300 | 460 | 1,100 | 5,700 | 375 | 325 | 225 |
| 8 (Invention) | $C_{16}H_{33}$ | 0.4 | .2 | 180 | 260 | 325 | 610 | 5,000 | 260 | 160 | 180 |
| 9 (Invention) | $C_{16}H_{33}$ | 0.4 | .5 | 78 | 150 | 225 | 360 | 2,420 | 225 | 73 | 72 |
| 10 (Invention) | $C_{16}H_{33}$ | 0.4 | 1.0 | 75 | 130 | 200 | 250 | 1,350 | 225 | 75 | 75 |
| 11 (HMHEC) | $C_{16}H_{33}$ | 0.7 | — | 14,400 | 14,200 | 7,000 | 900 | ins | 14,400 | 14,400 | 14,400 |
| 12 (Invention) | $C_{16}H_{33}$ | 0.7 | .05 | 16,800 | 16,000 | 7,800 | 1,450 | ins | 9,400 | 14,400 | 16,800 |
| 13 (Invention)[3] | $C_{16}H_{33}$ | 0.7 | .2 | 7,900 | 12,200 | 11,700 | 7,100 | ins | 13,600 | 7,600 | 7,900 |
| 14 (Invention) | $C_{16}H_{33}$ | 0.7 | .5 | 1,900 | 16,000 | 22,500 | 12,800 | 1,200 | 17,400 | 1,500 | 1,900 |
| 15 (Invention) | $C_{16}H_{33}$ | 0.7 | 1.0 | 380 | 3,400 | 5,200 | 6,800 | 2,150 | 10,000 | 375 | 360 |
| 16 (HMHEC) | $C_{16}H_{33}$ | 1.0 | — | 4,700 | 3,800 | 225 | ins | ins | 4,700 | 4,700 | 4,700 |
| 17 (Invention) | $C_{16}H_{33}$ | 1.0 | .05 | 21,000 | 9,500 | 1,500 | ins | ins | 9,000 | 22,000 | 21,000 |
| 18 (Invention) | $C_{16}H_{33}$ | 1.0 | .2 | 40,000 | 15,000 | 5,800 | 520 | ins | 10,200 | 45,000 | 40,000 |
| 19 (Invention) | $C_{16}H_{33}$ | 1.0 | .5 | 26,400 | 30,000 | 15,000 | 2,950 | ins | 33,000 | 26,400 | 26,400 |
| 20 (Invention) | $C_{16}H_{33}$ | 1.0 | 1.0 | 5,500 | 19,000 | 16,000 | 6,000 | ins | 11,000 | 3,900 | 5,500 |
| 21 (HMHEC) | $C_{16}H_{33}$ | 1.4 | — | ins | ins | ins | ins | ins | ins | ins | ins |
| 22 (Invention) | $C_{16}H_{33}$ | 1.4 | .05 | 12,000 | ins | ins | ins | ins | ins | 4,500 | 12,000 |
| 23 (Invention) | $C_{16}H_{33}$ | 1.4 | .2 | 49,000 | 10,000 | ins | ins | ins | 44,000 | 53,000 | 49,000 |
| 24 (Invention) | $C_{16}H_{33}$ | 1.4 | .5 | 57,000 | 22,000 | 7,500 | ins | ins | 58,000 | 52,000 | 57,000 |
| 25 (Invention) | $C_{16}H_{33}$ | 1.4 | 1.0 | 36,500 | 14,000 | 2,200 | ins | ins | 31,000 | 36,000 | 36,500 |
| 26 (HMHEC) | $C_{16}H_{33}$ | 1.7 | — | ins | ins | ins | ins | ins | ins | ins | ins |
| 27 (Invention) | $C_{16}H_{33}$ | 1.7 | .2 | 56,000 | 2,100 | ins | ins | ins | 1,450 | 6,800 | 36,000 |
| 28 (CMHEC) | $C_{16}H_{33}$ | — | .5 | 50 | 40 | 35 | 35 | 30 | 50 | 52 | 50 |
| 29 (Invention) | $C_{12}H_{25}$ | .9 | .2 | 6,200 | 8,400 | 5,000 | 620 | ins | 8,400 | 6,200 | 6,200 |
| 30 (Invention) | $C_{12}H_{25}$ | .9 | .05 | 9,000 | 4,200 | 2,000 | 250 | ins | 6,000 | 9,050 | 9,000 |
| 31 (HMHEC) | $C_{12}H_{25}$ | .9 | — | 5,500 | 2,000 | 75 | ins | ins | 5,500 | 5,500 | 5,500 |
| 32 (Invention) | $C_8H_{17}$ | 3.4 | .2 | 840 | 970 | 600 | 35 | ins | 650 | 845 | 840 |
| 33 (HMHEC) | $C_8H_{17}$ | 3.4 | — | ins | ins | ins | ins | ins | ins | ins | ins |
| 34 (Invention) | $C_{20}H_{41}$ | .7 | .2 | 24,000 | 30,000 | 18,000 | 4,500 | ins | 9,000 | 19,000 | 24,000 |
| 35 (HMHEC) | $C_{20}H_{41}$ | .7 | — | 18,000 | 16,000 | 1,400 | ins | ins | 18,000 | 17,400 | 18,000 |

[1]Carboxymethyl degree of substitution.
[2]"ins" means insoluble.
[3]CMHMHEC prepared in the Preparation Example.

Several notable and unusual effects have been observed to be caused by the products of this invention.

Aqueous solution behavior is dependent on both the hydrophobe and carboxymethyl content of the polymer. When a series of HMHECs (varying CM levels) is completely soluble in the medium, carboxymethylation of that sample results in a lowering of viscosity proportional to the C.M.D.S. On the other hand, at higher hydrophobe levels and higher salt levels where solubility is often not complete, increasing carboxymethyl levels result in increased solubility and thus, higher viscosity. This is significant since many water-insoluble HMHECs are rendered fully water-soluble and highly viscosifying with only a small C.M.D.S. For instance, compare examples 21-23 and 26-27. Thus, as demonstrated in the examples, materials of high hydrophobe level, which are normally of little utility in water-based systems, may be rendered water-soluble by carboxymethylation.

The above examples also show that the aqueous solution viscosities of these materials are also pH dependent, depending on both the hydrophobe and carboxymethyl level of the polymer. Fully water-soluble materials have increased viscosity at lower pH (examples 9-10 and drophobic materials and a loss of viscosity will result in those cases.

EXAMPLES 36-42 (COMPARISON)

These examples demonstrate latex paints prepared with hydrophobically modified hydroxyethyl cellulose polymers per this invention.

An acrylic paint (semigloss interior white paint based on Rhoplex TM AC-417 acrylic latex from Rohm & Haas Co., Philadelphia, Penn.) was made as follows.

The following were ground at high speed (Cowles) for 20 minutes.

| Material | Weight Ratio | Comments |
|---|---|---|
| Propylene Glycol | 80.0 | — |
| Tamol SG-1 (Rohm & Haas Co.) | 8.5 | Dispersant |
| Deefo 495 (Ultra Adhesives) | 2.0 | Antifoamer |
| Ti-Pure R-901 | 240.0 | Opacifying Agent |
| Silica 1160 | 25.0 | — |

Then, the resultant slurry was pumped into a letdown tank, the following were added, and the resultant slurry was mixed at low speed for 20 minutes.

| Material | Weight Ratio | Comments |
|---|---|---|
| Water | 24.5 | — |
| Deefo 495 | 2.7 | Antifoamer |
| Propylene Glycol | 10.0 | — |
| Texanol (Eastman Chemical Products) | 21.6 | Coalescent |
| Super Ad-It (Tenneco Chem. Inc.) | 1.0 | Preservative |
| Triton GR-7M (Rohm and Haas Co.) | 0.5 | Surfactant |
| Rhoplex AC-417 | 500.0 | Acrylic Latex |

Subsequently, the paint was thickened by post-addition of a 5% aqueous solution of the respective thickener and, if necessary, plain water, in amounts sufficient to bring the paint to constant viscosity (100 Krebs Units viscosity). The total of the solution and added water (where used) was 150 parts by weight (the paints all had a total of 1065.8 parts by weight). An untinted thickened white paint was formed.

Subsequently, color development was assessed using the finger rub-up method by dividing each sample into four parts, adding 1 g of a colorant to 50 g of untinted paint, then shaking for ten minutes on a paint shaker. Five mil (wet) films were cast for each paint on Leneta Form 1B Penopac charts. Portions of the wet films were finger rubbed (after 30 seconds drying time on unprimed substrate and 5 minutes drying time on primed substrate) until tacky to the touch.

The term "color development" is used to refer to the unwanted shading of a particular color from the same can of tinted latex paint when applied under different rates of shear (i.e., roller applied versus brush applied). Table 2 below provides color development values obtained for the above samples. Relative values of zero (no color change after rubbing) though 5 (maximum color change) were assigned. Negative or positive signs indicate a lighter or darker coloration (compared to unrubbed portion of the film) respectively. Accordingly, values of zero represent excellent color development properties (i.e., no tint contrast or shading) while values of five (positive or negative) represent the worst color development properties (maximum shading or tint contrast).

provide as thickeners in latex paints such as spatter resistance and improved high shear viscosity.

When used as a thickener in paint, CMHMHEC produces similar gloss properties to HEC and superior gloss properties to HMHEC.

The modified cellulose ethers of this invention are useful as noted above and as stabilizers in emulsion polymerization, as thickeners in cosmetics and shampoos, and as flocculants in mineral processing. Very small amounts of low molecular weight modified cellulose ethers of this invention can outperform larger quantities of higher molecular weight conventional cellulose ethers.

While the invention has been described with respect to specific embodiments, it should be understood that the invention should not be limited thereto and that many variations and modifications are possible without departing from the scope of the invention.

What is claimed is:

1. An anionic water-soluble carboxymethyl hydrophobically modified hydroxyethyl cellulose polymer having a hydroxyethyl molar substitution of from 1.8 to 5.0 and a carboxymethyl degree of substitution of from 0.1 to less than 1.0 which is hydrophobically modified with a saturated long chain hydrocarbon group having 8 to 25 carbon atoms in an amount from about 0.10 to about 4.0%, by weight of the total cellulose polymer.

2. The water-soluble carboxymethyl hydrophobically modified hydroxyethyl cellulose polymer of claim 1 having a Brookfield LVF Viscosity of about 5 to about 60,000 centipoise in a 1 weight % solution at 6 rpm.

3. The water-soluble carboxymethyl hydrophobically modified hydroxyethyl cellulose polymer of claim 1 wherein the hydroxyethyl molar substitution is from about 2.5 to about 4.5.

4. The water-soluble carboxymethyl hydrophobically modified hydroxyethyl cellulose polymer of claim 1 wherein the saturated long chain hydrocarbon group has 8 to 18 carbon atoms.

5. The water-soluble carboxymethyl hydrophobically modified hydroxyethyl cellulose polymer of claim 1 wherein saturated long chain hydrocarbon group is present in an amount of about 0.2 to 2.5%.

6. The water-soluble carboxymethyl hydrophobically modified hydroxyethyl cellulose polymer of claim 1 wherein the saturated long chain hydrocarbon group is

TABLE 2

| | | Color Development Values With Four Colorants | | | | | | | |
|---|---|---|---|---|---|---|---|---|---|
| Example No. | Wt. % Polymer[1] | Wt. % Hydrophobe $C_{16}H_{33}$ | D.P.[2] | C.M.D.S. | H.E.M.S.[3] | Phthalo Blue | Red Oxide | Yellow Oxide | Lamp Black |
| 36 (HMHEC) | .30 | .4 | 700 | — | 3.5 | 4 | 3 | 2 | 4 |
| 37 (Invention) | .48 | .4 | 700 | .2 | 3.5 | 1 | 4 | 1 | 2 |
| 38 (Invention) | .48 | .3 | 700 | .3 | 3.5 | 1 | 4 | 1 | 2 |
| 39 (Invention) | .48 | .3 | 700 | .5 | 3.5 | 1 | 4 | 1 | 2 |
| 40 (HEC)[4] | .30 | — | 2400 | — | 2.5 | 0 | 4 | 1 | 1 |

[1]Based on total weight of the paint.
[2]Degree of Polymerization.
[3]Hydroxyethyl molar substitution.
[4]Natrosol 250 HBR HEC (Natrosol is a trademark of Hercules Incorporated.).

As can be seen in Table 2, CMHMHEC provides dramatically improved color development properties over HMHEC. In fact, results obtained with CMHMHEC are comparable to those obtained with HEC, which is the industry standard. These benefits are provided without sacrifice of any of the other benefits that hydrophobically modified water-soluble polymers attached to the cellulose ether substrate of the carboxymethyl hydrophobically modified hydroxyethyl cellulose polymer via an ether or ester linkage.

7. The water-soluble carboxymethyl hydrophobically modified hydroxyethyl cellulose polymer of claim 1 wherein the saturated long chain hydrocarbon group is attached to the cellulose ether substrate of the carboxymethyl hydrophobically modified hydroxyethyl cellulose polymer via an ether linkage.

8. The water-soluble carboxymethyl hydrophobically modified hydroxyethyl cellulose polymer of claim 1 wherein the hydroxyethyl cellulose furnish has a molecular weight of about 50,000 to about 400,000.

9. The water-soluble carboxymethyl hydrophobically modified hydroxyethyl cellulose of claim 1 having a carboxymethyl degree of substitution of 0.5 or less.

10. The water-soluble carboxymethyl hydrophobically modified hydroxyethyl cellulose of claim 2 having a carboxymethyl degree of substitution of 0.5 or less.

11. The water-soluble carboxymethyl hydrophobically modified hydroxyethyl cellulose polymer of claim 2 wherein the straight-chain hydrocarbon group has 8 to 18 carbon atoms.

12. The water-soluble carboxymethyl hydrophobically modified hydroxyethyl cellulose of claim 11 having a carboxymethyl degree of substitution of 0.5 or less.

13. The water-soluble carboxymethyl hydrophobically modified hydroxyethyl cellulose polymer of claim 12 wherein the straight chain hydrocarbon group is attached to the cellulose ether substrate of the carboxymethyl hydrophobically modified hydroxyethyl cellulose polymer via an ether or ester linkage.

14. The water-soluble carboxymethyl hydrophobically modified hydroxyethyl cellulose polymer of claim 12 wherein the straight chain hydrocarbon group is attached to the cellulose ether substrate of the carboxymethyl hydrophobically modified hydroxyethyl cellulose polymer via an ether linkage.

* * * * *

UNITED STATES PATENT AND TRADEMARK OFFICE
CERTIFICATE OF CORRECTION

PATENT NO.    :   4,826,970
DATED         :   May 2, 1989
INVENTOR(S)   :   REID & ROYCE 1

It is certified that error appears in the above-identified patent and that said Letters Patent is hereby corrected as shown below:

(57) Abstract,  " anianic "

should read   -- anionic --

(57) Abstract,  " coloids "

should read   -- colloids --

Column 8, Claim 5, Line 43, after wherein  -- the -- was omitted

Signed and Sealed this

Second Day of January, 1990

*Attest:*

JEFFREY M. SAMUELS

*Attesting Officer*      *Acting Commissioner of Patents and Trademarks*